(12) United States Patent
Usami (10) Patent No.: US 10,332,487 B2
(45) Date of Patent: Jun. 25, 2019

(54) INFORMATION DISPLAY SYSTEM (71) Applicant: FUJIFILM Corporation, Tokyo (JP)

(72) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 6 days.

(21) Appl. No.: 15/828,554

(22) Filed: Dec. 1, 2017

(65) Prior Publication Data

US 2018/0090106 A1    Mar. 29, 2018

Related U.S. Application Data

(63) Continuation of application No. PCT/JP2016/065033, filed on May 20, 2016.

(30) Foreign Application Priority Data

Jun. 3, 2015 (JP) ................................. 2015-113042

(51) Int. Cl.
*G09G 5/00* (2006.01)
*G09G 5/22* (2006.01)
(Continued)

(52) U.S. Cl.
CPC ............. *G09G 5/22* (2013.01); *G06K 7/10* (2013.01); *G06K 19/077* (2013.01); *G06K 19/14* (2013.01);
(Continued)

(58) Field of Classification Search
CPC .. G06K 19/00; G06K 7/00; G09F 3/00; G09F 9/00; G09G 5/00; G06Q 10/08; B29C 49/78
See application file for complete search history.

(56) References Cited

U.S. PATENT DOCUMENTS 7,551,165 B2 * 6/2009 Goodman ............ G06Q 10/087
345/204
2006/0197724 A1 * 9/2006 Sakai ..................... G09G 3/2096
345/87
(Continued)

FOREIGN PATENT DOCUMENTS

JP    2007-312979 A    12/2007
JP    2008-086452 A     4/2008
(Continued)

OTHER PUBLICATIONS

International Search Report issued in PCT/JP2016/065033; dated Aug. 23, 2016.
(Continued)

*Primary Examiner* — Pegeman Karimi
(74) *Attorney, Agent, or Firm* — Studebaker & Brackett PC (57) ABSTRACT

An information display system comprising a tag including a signal receiver, a data code, and an image-memory-type display medium that displays an image based on an image display signal; and a reader/writer including a contact electrode unit that contacts the signal receiver, an information recognition unit that recognizes the data code and the display image, a memory that stores image display information corresponding to information included in the data code and information of a data code, and a writing unit that transmits an image display signal based on the image display information through the electrode unit. The recognition unit reads and compares the information included in the read data code with the information of the stored data code, and when identical, the writing unit transmits the image display signal through the electrode unit to display the image on the display medium, which is checked by the recognition unit.

14 Claims, 5 Drawing Sheets

(51) Int. Cl.
*G06K 7/10* (2006.01)
*G06K 19/077* (2006.01)
*G06K 19/14* (2006.01)
*G09F 3/00* (2006.01)
*G09G 3/20* (2006.01)
*G09G 3/34* (2006.01)

(52) U.S. Cl.
CPC ............... *G09F 3/00* (2013.01); *G09G 3/20* (2013.01); *G09G 3/34* (2013.01); *G09G 5/003* (2013.01); *G09G 2370/18* (2013.01); *G09G 2380/04* (2013.01); *G09G 2380/08* (2013.01); *G09G 2380/14* (2013.01)

(56) References Cited

U.S. PATENT DOCUMENTS

| | | | |
|---|---|---|---|
| 2010/0065634 | A1 | 3/2010 | Nakamura |
| 2010/0076872 | A1* | 3/2010 | Nakamura ............. G06Q 10/08 |
| | | | 705/28 |
| 2010/0315677 | A1 | 12/2010 | Yamamoto |
| 2013/0110282 | A1 | 5/2013 | Omura |
| 2014/0139500 | A1* | 5/2014 | Kimura .................... G09G 5/12 |
| | | | 345/204 |
| 2014/0245045 | A1* | 8/2014 | Haruki .................... G06F 1/329 |
| | | | 713/323 |
| 2016/0275880 | A1* | 9/2016 | Chen ....................... G09G 5/003 |

FOREIGN PATENT DOCUMENTS

| | | |
|---|---|---|
| JP | 2008-217476 A | 9/2008 |
| JP | 2009-075146 A | 4/2009 |
| JP | 2010-170692 A | 8/2010 |
| JP | 2010-288224 A | 12/2010 |
| JP | 2012-014383 A | 1/2012 |
| JP | 2015-020869 A | 2/2015 |
| WO | 2009/044598 A1 | 4/2009 |
| WO | 2012/005039 A1 | 1/2012 |
| WO | 2014/148272 A1 | 9/2014 |

OTHER PUBLICATIONS

Written Opinion of the International Searching Authority issued in PCT/JP2016/065033; dated Aug. 23, 2016.
An Office Action mailed by the Japanese Patent Office dated Oct. 2, 2018, which corresponds to Japanese Patent Application No. 2017-521816 and is related to U.S. Appl. No. 15/828,554.
An Office Action mailed by the Japanese Patent Office dated Jan. 8, 2019, which corresponds to Japanese Patent Application No. 2017-521816 and is related to U.S. Appl. No. 15/828,554.

* cited by examiner

INFORMATION DISPLAY SYSTEM

CROSS-REFERENCE TO RELATED APPLICATIONS

This application is a Continuation of PCT International Application No. PCT/JP2016/065033 filed on May 20, 2016, which claims priority under 35 U.S.C. § 119(a) to Japanese Patent Application No. 2015-113042 filed on Jun. 3, 2015. The above application is hereby expressly incorporated by reference, in its entirety, into the present application.

BACKGROUND OF THE INVENTION

1. Field of the Invention

The present invention relates to an information display system using a tag including an image-memory-type display medium, such as an electronic paper, and more particularly, to an information display system that transmits an image display signal to the image-memory-type display medium in a contact manner, has a simple configuration, and can prevent an error in display.

2. Description of the Related Art

In the related art, for example, the name and price of an article are written to a tag by hand. In addition, in a case in which medicines are administered to patients in the hospital, a tag is attached to medicines used for each patient. In a case in which a medicine is administered, the name of the patient is written to the tag by hand. In recent years, an electronic paper has been used as the tag. A system has been proposed which writes information to a tag, without handwriting.

JP2009-75146A discloses a rewriting system in which a plurality of electronic papers are rewritable on the basis of the positional relationship between the electronic papers.

In the rewriting system disclosed in JP2009-75146A, identification information is allocated to the electronic paper in advance and the electronic paper receives rewriting information for rewriting display content and rewrites the display content to the received rewriting information. A rewriting device includes: detection means for detecting the position of each electronic paper; acquisition means for acquiring identification information; association means for associating the acquired identification information of the electronic paper with the detected position of the electronic paper; storage means for storing rewriting information that is prepared in advance so as to correspond to each electronic paper in order to rewrite the display content of a plurality of electronic papers; and means for transmitting the rewriting information stored so as to correspond to the electronic paper, to which the identification information associated with the position of the electronic paper by the association means has been assigned, to the electronic paper to rewrite the display content of each electronic paper in a case in which the display content of each electronic paper is rewritten.

SUMMARY OF THE INVENTION

In a case in which a tag is written by hand, there is a problem that a mistake in writing occurs. In this case, for example, the name and price of an article are incorrectly displayed. In the case of medicines, the medicines are likely to be incorrectly administered.

The rewriting system disclosed in JP2009-75146A can rewrite the display content of a plurality of electronic papers on the basis of the positional relationship between the electronic papers. However, the rewriting system includes a wireless communication unit and has the problem that both the configuration of the rewriting device and the configuration of the electronic paper become complicated.

The invention has been made in order to solve the problems of the related art and an object of the invention is to provide an information display system that has a simple configuration and can prevent an error in display.

In order to achieve the object, an aspect of the invention provides an information display system comprising: a tag comprising a signal receiving unit, a data code, and an image-memory-type display medium that displays a display image on the basis of an image display signal; and a reader/writer comprising a contact electrode unit that comes into contact with the signal receiving unit, an information recognition unit that recognizes the data code and the display image of the image-memory-type display medium, a memory that stores image display information corresponding to information included in the data code and information of a data code, and a writing unit that transmits an image display signal based on the image display information through the contact electrode unit. In the reader/writer, in a case in which the contact electrode unit of the reader/writer comes into contact with the signal receiving unit of the tag, the information recognition unit of the reader/writer reads the data code to obtain the information included in the data code and compares the information included in the read data code with the information of the data code stored in the memory. In a case in which the read data code is identical to the data code stored in the memory, the writing unit transmits the image display signal based on the image display information included in the data code stored in the memory through the contact electrode unit such that the display image is displayed on the image-memory-type display medium. After the transmission, the information recognition unit checks the display image.

Preferably, the information recognition unit compares the information included in the read data code with the information of the data code stored in the memory and issues a warning in a case in which the read data code is not identical to the data code stored in the memory.

For example, the data code includes a bar code, a character, or a symbol.

For example, the information recognition unit includes an optical reading unit. Preferably, the optical reading unit includes an image sensor or a laser scanner.

Preferably, the image-memory-type display medium is supplied with power from the reader/writer and displays the display image and the reader/writer includes a power supply unit that supplies power to the image-memory-type display medium.

According to the invention, it is possible to prevent an error in display with a simple configuration.

DESCRIPTION OF THE PREFERRED EMBODIMENTS

Hereinafter, an information display system according to the invention will be described in detail on the basis of a preferred embodiment illustrated in the accompanying drawings.

Figure 1:
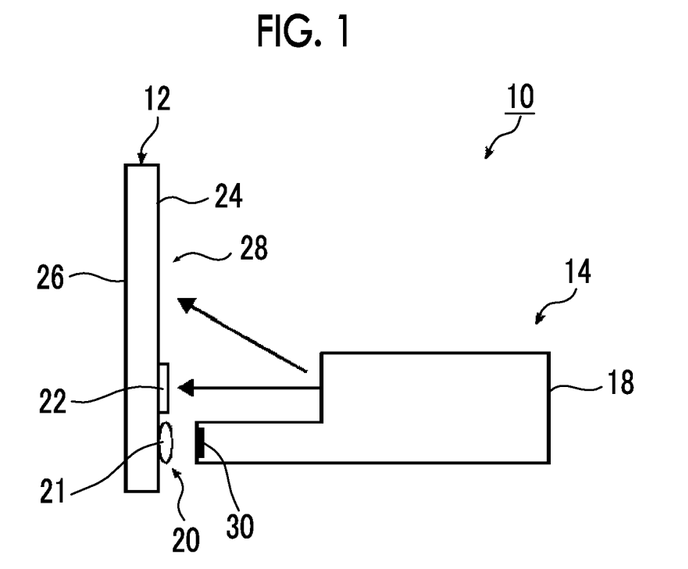
FIG. 1 is a diagram schematically illustrating an information display system according to an embodiment of the invention.
Figure 2:
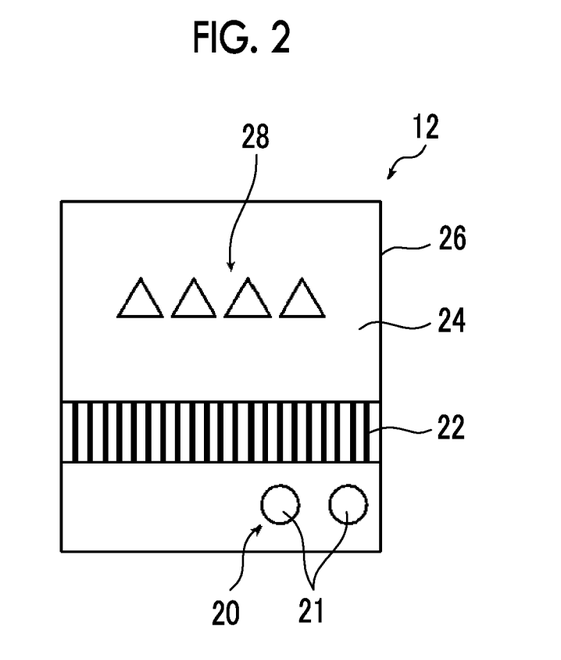
FIG. 2 is a diagram schematically illustrating a tag of the information display system according to the embodiment of the invention.
Figure 3:
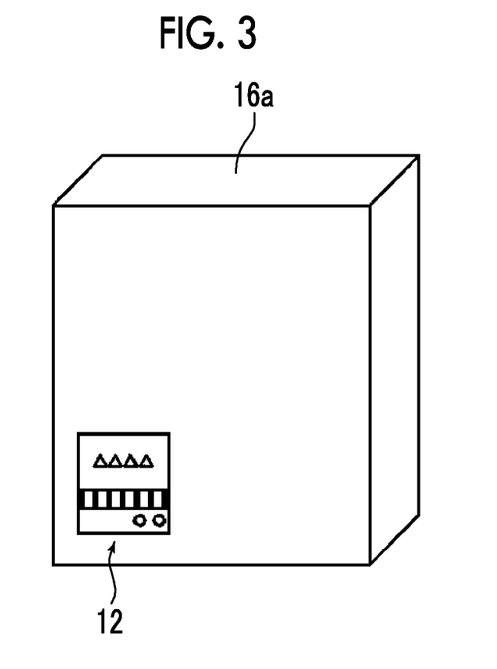
FIG. 3 is a perspective view schematically illustrating a first example of the usage of the tag.
Figure 4:
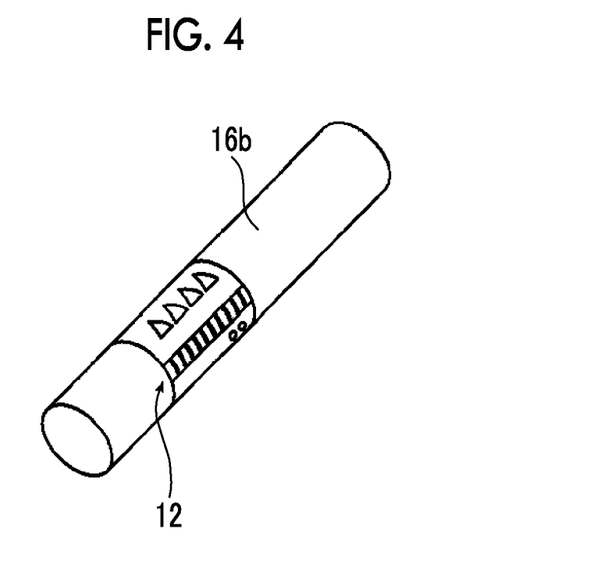
FIG. 4 is a perspective view schematically illustrating a second example of the usage of the tag.
Figure 5:
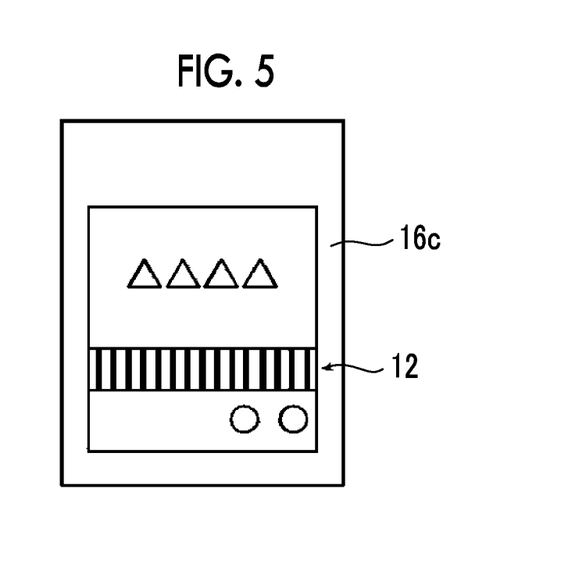
FIG. 5 is a plan view schematically illustrating a third example of the usage of the tag.

FIG. 1 is a diagram schematically illustrating an information display system according to an embodiment of the invention. FIG. 2 is a diagram schematically illustrating a tag of the information display system according to the embodiment of the invention. FIG. 3 is a perspective view schematically illustrating a first example of the usage of the tag. FIG. 4 is a perspective view schematically illustrating a second example of the usage of the tag. FIG. 5 is a perspective view schematically illustrating a third example of the usage of the tag.

As illustrated in FIG. 1, an information display system 10 includes a tag 12 and a reader/writer 14.

The tag 12 is attached to an object and is used. The tag 12 has the information of the object.

As illustrated in FIG. 3, for example, the tag 12 is attached to a container 16a and is used. The container 16a is filled with gas, liquid, solid, or a mixture of at least two of them. For example, the container 16a is an infusion bag.

As illustrated in FIG. 4, the tag 12 is attached to a cylindrical container 16b and is used. The cylindrical container 16b is filled with gas, liquid, solid, or a mixture of at least two of them. For example, the cylindrical container 16b is a prefilled syringe.

As illustrated in FIG. 5, the tag 12 is attached to a film-shaped or flat-plate-shaped sheet 16c and is used as a price tag or an article tag. For example, the tag 12 can be used for a ticket and a coupon, in addition to the price tag and the article tag.

The tag 12 illustrated in FIGS. 1 and 2 includes a signal receiving unit 20, a data code 22, and an image-memory-type display medium 24 which are provided in a sheet body 26.

The signal receiving unit 20 is used to supply an image display signal to the image-memory-type display medium 24. The signal receiving unit 20 includes, for example, two electrodes 21.

The data code 22 has the information of the object having the tag 12 attached thereto. The data code 22 is, for example, a bar code. However, the data code 22 is not limited thereto. For example, the data code 22 includes characters, symbols, or a combination of characters and symbols. The data code 22 is formed by, for example, printing.

The data code 22 is read by the reader/writer 14 and the object with the tag 12 is specified. That is, it is specified where the tag 12 is attached.

Figure 6:
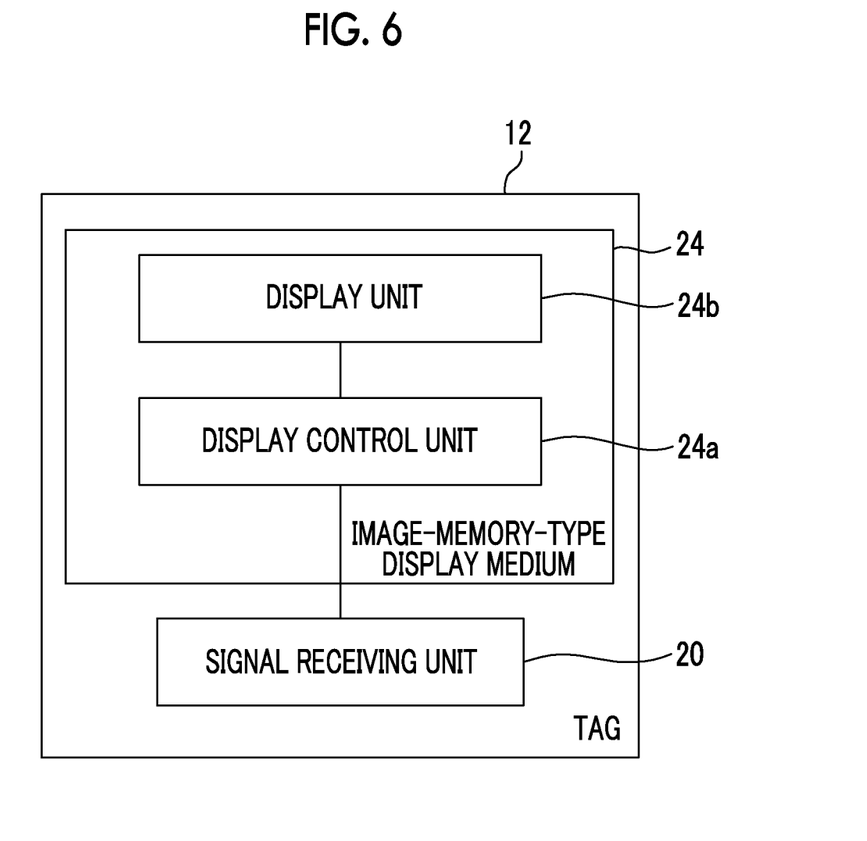
FIG. 6 is a block diagram illustrating the configuration of the tag of the information display system according to the embodiment of the invention.

FIG. 6 is a block diagram illustrating the configuration of the tag in the information display system according to the embodiment of the invention.

The image-memory-type display medium 24 displays a display image 28 (see FIG. 2) on the basis of an image display signal and has a memory function of retaining the display image 28 that has been displayed once.

As illustrated in FIG. 6, the image-memory-type display medium 24 includes a display control unit 24a and a display unit 24b. The image-memory-type display medium 24 is, for example, an electronic paper. The display control unit 24a includes, for example, a driving circuit including a thin film transistor and a non-volatile storage unit which are not illustrated in FIG. 6. The display unit 24b displays the display image 28. The display control unit 24a is connected to the signal receiving unit 20 and is supplied with an image display signal through the signal receiving unit 20.

In the image-memory-type display medium 24, an image display signal is input to the display control unit 24a and the display image 28 is displayed on the display unit 24b on the basis of the image display signal. The display image 28 is displayed on the basis of the image display signal and includes characters and symbols, in addition to an image. Examples of the display image 28 include a user, an owner, an article name, and a price.

In a case in which the image-memory-type display medium 24 does not include a power supply unit, such as a battery, a direct current signal or an alternating current signal with a predetermined voltage for driving the display control unit 24a is supplied through the signal receiving unit 20.

The tag 12 indicates the information of the object having the tag 12 attached thereto as described above. An image display signal may be rewritten to the image-memory-type display medium 24 or may not be rewritten to the image-memory-type display medium 24. The image-memory-type display medium 24 is not particularly limited. However, it is preferable that the image display signal is not capable of being rewritten to the image-memory-type display medium 24, that is, the display image 28 is not capable of being rewritten to the image-memory-type display medium 24 in terms of information security.

As a method in which the image display signal is not capable of being rewritten, the image display signal may not be rewritten in a system in which the image display signal can be rewritten or a display medium to which the image display signal is not capable of being physically rewritten may be used. In this case, it is preferable that the display medium to which the image display signal is not capable of being physically rewritten is used in terms of information security.

As a specific example of the display medium to which the image display signal is not capable of being rewritten, for example, the image-memory-type display medium 24 is preferably an electronic paper to which the image display signal is written only once, that is, a so-called write-once electronic paper. For example, the write-once electronic paper can be implemented by limiting the number of times the image display signal is written to the storage unit of the display control unit 24a of the image-memory-type display medium 24 to one or by using a heat-sensitive type as the display type of the electronic paper.

For example, the following types of electronic papers can be used: a microcapsule type; an electrophoresis type; a liquid crystal type; an electronic liquid powder type; an electrowetting type; a chemical change type; and a heat-sensitive material type.

A liquid crystal display device may be used as the image-memory-type display medium 24.

Figure 7:
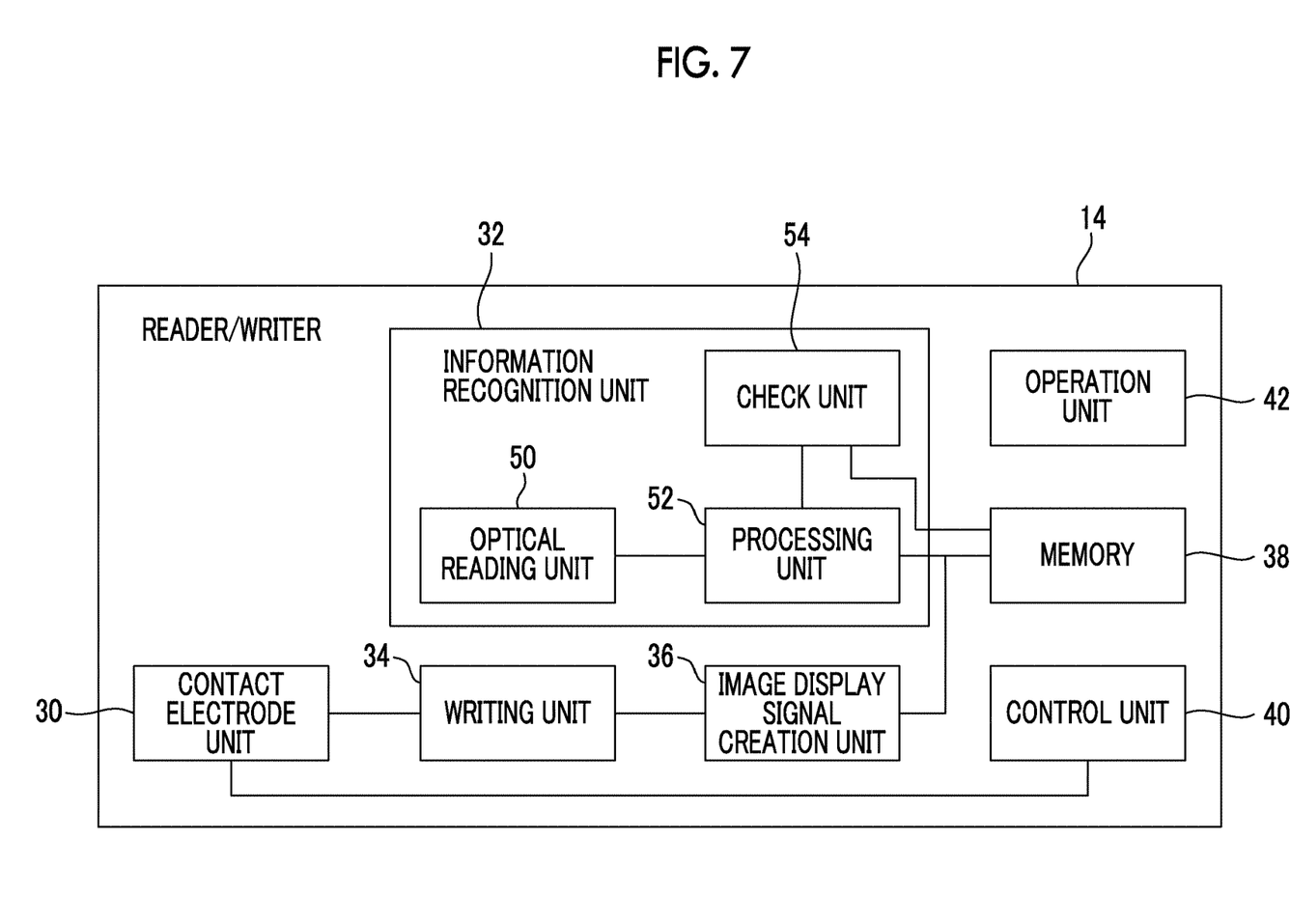
FIG. 7 is a block diagram illustrating the configuration of a reader/writer of the information display system according to the embodiment of the invention.

FIG. 7 is a block diagram illustrating the configuration of the reader/writer in the information display system according to the embodiment of the invention. In the reader/writer 14, the configuration illustrated in FIG. 7 is accommodated in a housing 18 (see FIG. 1).

The reader/writer 14 includes a contact electrode unit 30, an information recognition unit 32, a writing unit 34, an image display signal creation unit 36, a memory 38, a control unit 40, and an operation unit 42. In the reader/writer 14, the control unit 40 controls the operation of the contact electrode unit 30, the information recognition unit 32, the writing unit 34, the image display signal creation unit 36, and the memory 38 and the transmission and reception of data between these components.

The operation unit 42 is used to input a command to the reader/writer 14 by the user of the reader/writer 14. A command input through the operation unit 42 is input to the control unit 40 and the reader/writer 14 performs an operation corresponding to the input command. The operation unit 42 can have any configuration as long as it can input a command. For example, a display unit, an operation button, or a touch sensor used to input a command can be appropriately used as the operation unit 42. In addition, the operation unit 42 may generate sounds. In this case, it is possible to generate warning sounds.

The contact electrode unit 30 comes into contact with the signal receiving unit 20 and is a contact with the tag 12. The contact electrode unit 30 has the same configuration as the signal receiving unit 20. For example, the contact electrode unit 30 includes an electrode having the same configuration as the electrode 21 (see FIG. 2) of the signal receiving unit 20 (see FIG. 2), which is not illustrated in the drawings.

The control unit 40 monitors the electrical connection of the contact electrode unit 30. In a case in which the contact electrode unit 30 comes into contact with the signal receiving unit 20 and is electrically connected thereto, the information recognition unit 32 reads the data code 22. The contact of the contact electrode unit 30 with the signal receiving unit 20 is a trigger on the operation of the reader/writer 14. For example, the electrical connection can be detected by a change in the resistance value of the contact electrode unit 30.

The information recognition unit 32 recognizes the data code 22 and the display image 28 of the image-memory-type display medium 24. The information recognition unit 32 may have any configuration as long as it can recognize the data code 22 and the display image 28 of the image-memory-type display medium 24.

For example, the information recognition unit 32 includes an optical reading unit 50, a processing unit 52, and a check unit 54. The optical reading unit 50 optically reads the data code 22 and the display image 28. The processing unit 52 processes the read signal obtained by the optical reading unit 50. For example, the processing unit 52 converts the read signal into a digital signal and obtains read data of the data code 22 and the display image 28. The check unit 54 checks whether the display image 28 of the image-memory-type display medium 24 is appropriate.

The optical reading unit 50 includes an image sensor, such as a charge coupled device (CCD) sensor and a complementary metal oxide semiconductor (CMOS) sensor. The optical reading unit 50 may be, for example, a laser scanner including a light source and a light receiving element. The scanning system of the laser scanner is not particularly limited. For example, the scanning system may be a one-dimensional linear scanning system or a two-dimensional surface scanning system.

The processing unit 52 processes the read signal obtained by the optical reading unit 50. For example, the processing unit 52 converts the read signal into a digital signal and obtains the read data of the data code 22 and the display image 28. In addition, the processing unit 52 performs a decoding process or an optical character recognition process for the read data, which will be described below. The read data or the processed read data obtained by the processing unit 52 is stored in the memory 38.

In a case in which the data code 22 is a bar code, the decoding process is performed for the read data to acquire the information of the data code 22.

In a case in which the data code 22 is characters, symbols, or a combination of characters and symbols, the optical character recognition process is performed for the read data to acquire the information of the data code 22.

For the display image 28, the optical character recognition process is performed for the read data to acquire the information of the display image 28.

In the information recognition unit 32, for example, the control unit 40 controls the reading of the data code 22 and the display image 28 such that the data code 22 is read after the contact electrode unit 30 is electrically connected and the display image 28 is read after the contact electrode unit 30 is electrically connected and the image display signal is transmitted. Therefore, even in a case in which both the data code 22 and the display image 28 include characters or symbols, an appropriate process can be performed for the data code 22 and the display image 28.

The data code 22 and the display image 28 are located at different positions in the tag 12. Therefore, the positions where the data code 22 and the display image 28 are read are predetermined and reading is performed at the predetermined positions. With this configuration, it is possible to read the data code 22 and the display image 28 without any error.

The check unit 54 compares information included in the data code 22 obtained by the information recognition unit 32 with the information of the data code stored in the memory 38 and determines whether the data code 22 obtained by the information recognition unit 32 is identical to the data code stored in the memory 38. In this way, it is possible to prevent an error in display on the tag 12.

In a case in which the data code 22 in the read tag 12 is not identical to the data code stored in the memory 38, that is, in a case in which a different tag is read, the control unit 40 stops the process of the reader/writer 14. Therefore, even in a case in which a different tag is included in a plurality of tags, it is possible to prevent the display image from being written to the different tag. In this case, a warning may be issued to the operation unit 42 by, for example, an image or sounds. In this way, it is possible to inform the user of the different tag.

In a case in which the data code 22 in the read tag 12 is identical to the data code stored in the memory 38, the process of the reader/writer 14 is continuously performed.

The check unit 54 determines whether the data codes 22 are identical to each other as described above. In a case in which the data code 22 is a bar code, the check unit 54 compares decoded signals and determines whether the decoded signals are identical to each other.

In a case in which the data code 22 includes a character and a symbol, for example, a threshold value is set in advance by, for example, pattern matching and it is determined whether the data codes 22 are identical to each other on the basis of the degree of matching between patterns during pattern matching, which will be described below.

The check unit 54 checks whether the display image 28 of the image-memory-type display medium 24 is appropriate. Here, the appropriate display image 28 means a display image without a display defect, such as a scratch or image loss.

The check unit 54 compares the read data of the display image 28 obtained by the information recognition unit 32 with the image display signal used for the display image. For example, pattern matching is used as the comparison method. A threshold value is set to the degree of matching between patterns during pattern matching in advance. In a case in which the degree of matching between the patterns is greater than the threshold value, it is determined that the display image has been appropriately displayed. On the other hand, in a case in which the degree of matching between the patterns is less than the threshold value, it is determined that the display image has not been appropriately displayed and the image display signal is transmitted from the writing unit 34 again. In this way, it is possible to appropriately display the display image 28.

The writing unit 34 transmits the image display signal for displaying the display image 28 on the image-memory-type display medium 24 from the contact electrode unit 30.

The image display signal creation unit 36 creates an image display signal. For example, the image display signal creation unit 36 creates the image display signal on the basis of image display information corresponding to the information included in the data code stored in the memory 38. The image display signal is used to form a display image indicating, for example, the owner of an object, the user of the object, the name of the object, the price of the object, and the expiration date of the object.

The image display signal creation unit 36 creates the image display signal from the image display information corresponding to the information included in the data code 22 stored in the memory 38. The image display signal is transmitted from the writing unit 34 at the time which will be described below.

In a case in which the image-memory-type display medium 24 does not have a power supply unit, such as a battery, is supplied with power from the reader/writer 14, and displays the display image 28 on the display unit 24b, the reader/writer 14 includes a power supply unit for supplying power to the image-memory-type display medium 24. The power supply unit includes, for example, the image display signal creation unit 36 and the writing unit 34. In this case, the image display signal creation unit 36 does not create the image display signal, generates a direct current signal or an alternating current signal with a predetermined voltage for driving the display control unit 24a, and the writing unit 34 transmits the direct current signal or the alternating current signal instead of the image display signal.

The memory 38 stores various kinds of information. The memory 38 stores the image display information corresponding to the information included in the data code 22. For example, in a case in which the information of the data code 22 is an article name, the memory 38 stores information about the name, price, expiration date, and the place of origin of the article as the image display information corresponding to the article name. In addition, in a case in which the information of the data code 22 is a medicine name, the memory 38 stores, as the image display information, the name of the patient to be given the medicine which corresponds to the medicine name.

In addition, the memory 38 stores the information of a data code for comparison with the information of the data code 22 obtained by the information recognition unit 32. As described above, in a case in which the data code 22 obtained by the information recognition unit 32 is not identical to the data code stored in the memory 38, the display image is not written and miswriting is prevented.

The memory 38 stores the information of a display image for comparison with the read data of the display image 28 obtained by the information recognition unit 32.

In addition, various kinds of information including the information of the data code stored in the memory 38 may be rewritten according to, for example, the purpose of use. A rewriting method may be a method that changes a recording medium of the memory 38 or a rewriting method through a wired or wireless communication line.

Figure 8:
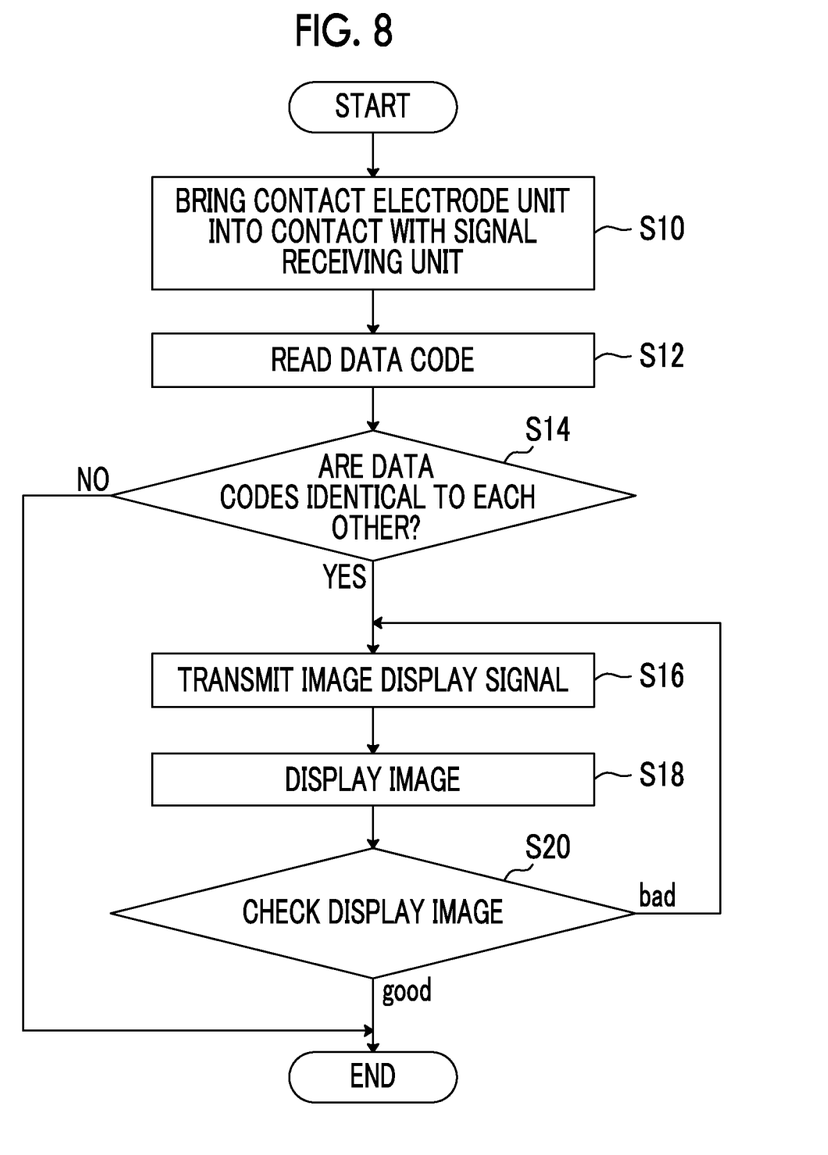
FIG. 8 is a flowchart illustrating the flow of an example of a display image writing process performed by the information display system according to the embodiment of the invention.

FIG. 8 is a flowchart illustrating the flow of an example of a display image writing process performed by the information display system according to the embodiment of the invention.

An example in which the tag 12 is attached to the container 16a as illustrated in FIG. 3 and the display image 28 of the information of the user of the container 16a, for example, the name of the user is displayed on the tag 12 on the basis of the data code 22 will be described. In this case, for example, an error in the writing of the name of a patient to the tag 12 is prevented and it is possible to prevent an error in injection in a case in which a liquid medicine is injected into the patient.

The contact electrode unit 30 of the reader/writer 14 is brought into contact with the signal receiving unit 20 of the tag 12 (Step S10). In this case, the control unit 40 detects the electrical connection of the contact electrode unit 30 and the information recognition unit 32 reads the data code 22, using the detection of the electrical connection as a trigger (Step S12). The processing unit 52 of the information recognition unit 32 obtains the information of the data code 22.

Then, the check unit 54 of the information recognition unit 32 checks whether the information of the data code 22 of the read tag 12 is identical to the information of the data code stored in the memory 38 (Step S14).

In a case in which it is checked in Step S14 that the data code 22 of the read tag 12 is not identical to the stored data code, the display image is not to be written to the tag 12. Therefore, the process of the reader/writer 14 is stopped and the display image 28 is not written to the tag 12. In this case, for example, a warning may be issued to inform the user of the reader/writer 14 of a different tag.

On the other hand, it is checked in Step S14 that the data code 22 of the read tag 12 is identical to the stored data code, the image display signal creation unit 36 creates an image display signal and the image display signal is transmitted from the writing unit 34 to the display control unit 24a of the image-memory-type display medium 24 through the contact electrode unit 30 and the signal receiving unit 20 of the tag 12 (Step S16).

The display image 28 is displayed on the display unit 24b on the basis of the transmitted image display signal (Step S18).

Then, the information recognition unit 32 reads the display image 28 to obtain the read data of the display image 28. As described above, the check unit 54 compares the read data with the image display signal to determine whether the display image 28 is appropriate (Step S20).

In a case in which it is determined in Step S20 that the display image 28 is appropriate, a series of processes for display the display image 28 on the tag 12 ends. The display image 28 is continuously displayed.

On the other hand, in a case in which it is determined in Step S20 that there is a scratch or an image loss in the display image 28 and the display image 28 is not appropriate, the image display signal is transmitted again (Step S16) and the display of the display image 28 on the image-memory-type display medium 24 (Step S18) and the checking of the display image 28 by the reader/writer 14 (Step S20) are repeated until the display image 28 is determined to be appropriate.

With the above-mentioned configuration, for example, in a case in which there are a plurality of kinds of medicines, a medicine name is recorded as the information of the data code 22 of the tag 12, and a patient and the name of the medicine to be administered to the patient are stored in the memory 38 of the reader/writer 14 so as to be associated with each other, the name of the patient is displayed on the tag 12 of a medicine that corresponds to the data code 22 and is to be administered to the patient among the plurality of kinds of medicines. In contrast, since a medicine that is not to be administered to the patient does not correspond to the data code 22, the name of the patient is not displayed on the tag 12. In this way, it is possible to prevent an error in writing to a medicine.

In the above-mentioned example, in Step S14, the information of the data code 22 of the read tag 12 is compared with the information of the data code stored in the memory 38. However, the invention is not limited thereto. For example, the target to be compared may be predetermined. Specifically, before Step S10, the information of a target data code is acquired and stored in the memory 38. For example, in a case in which the target data code is a bar code, the reader/writer 14 reads the bar code and the information of the target data code is stored in the memory 38. In this state, the process is performed from Step S10. In this way, it is possible to reduce the amount of information of the data code to be compared.

In the information display system 10, the display image 28 is obtained by a contact system in which the tag 12 and the reader/writer 14 come into contact with each other. Therefore, a display image is prevented from being written to another tag with which the reader/writer 14 does not come into contact, unlike a wireless system. In addition, for the tag 12, the information of another tag with which the reader/writer 14 does not come into contact is prevented from being read. Therefore, it is possible to prevent an error in the writing of the display image 28 to the tag 12. For example, in a case in which the information display system 10 is used to administer a medicine, a medicine name can be identical to a patient and it is possible to prevent an error in the administration of medicines.

As described above, in the contact system, the configuration of the tag 12 can be simpler than that of the wireless system requiring, for example, a receiving circuit and it is possible to reduce the costs of the tag 12. Therefore, it is possible to manufacture a disposable tag 12.

The invention basically has the above-mentioned configuration. The information display system according to the invention has been described in detail above. However, the invention is not limited to the above-described embodiment and various modifications and changes of the invention can be made without departing from the scope and spirit of the invention.

EXPLANATION OF REFERENCES

10: information display system
12: tag
14: reader/writer
16a: container
16b: cylindrical container
16c: sheet
18: housing
20: signal receiving unit
21: electrode
22: data code
24: image-memory-type display medium
24a: display control unit
24b: display unit
26: sheet body
28: display image
30: contact electrode unit
32: information recognition unit
34: writing unit
36: image display signal creation unit
38: memory
40: control unit
42: operation unit
50: optical reading unit
52: processing unit
54: check unit
S10: step
S12: step
S14: step
S16: step
S18: step
S20: step

What is claimed is:

1. An information display system comprising:
a tag comprising a signal receiving unit, a data code, and an image-memory-type display medium that displays a display image on the basis of an image display signal; and
a reader/writer comprising a contact electrode unit that comes into contact with the signal receiving unit, an information recognition unit that includes an optical reading unit optically reads the data code and the display image of the image-memory-type display medium, a memory that stores image display information corresponding to information included in the data code and information of a data code, and a writing unit that transmits to the image-memory-type display medium an image display signal based on the image display information through the contact electrode unit,
wherein, in the reader/writer, in a case in which the contact electrode unit of the reader/writer comes into contact with the signal receiving unit of the tag, the information recognition unit of the reader/writer optically reads the data code to obtain the information included in the data code and compares the information included in the read data code with the information of the data code stored in the memory,
in a case in which the read data code is identical to the data code stored in the memory, the writing unit transmits to the image-memory-type display medium the image display signal based on the image display information included in the data code stored in the memory through the contact electrode unit such that the display image is displayed on the image-memory-type display medium, and
after the transmission, the information recognition unit optically reads the display image.

2. The information display system according to claim 1, wherein the information recognition unit compares the information included in the read data code with the information of the data code stored in the memory and issues a warning in a case in which the read data code is not identical to the data code stored in the memory.

3. The information display system according to claim 2, wherein the data code includes a bar code, a character, or a symbol.

4. The information display system according to claim 3, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

5. The information display system according to claim 2, wherein the optical reading unit includes an image sensor or a laser scanner.

6. The information display system according to claim 5, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

7. The information display system according to claim 2, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

8. The information display system according to claim 1, wherein the data code includes a bar code, a character, or a symbol.

9. The information display system according to claim 8, wherein the optical reading unit includes an image sensor or a laser scanner.

10. The information display system according to claim 9, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

11. The information display system according to claim 8, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

12. The information display system according to claim 1, wherein the optical reading unit includes an image sensor or a laser scanner.

13. The information display system according to claim 12, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

14. The information display system according to claim 1, wherein the image-memory-type display medium includes a display unit that displays the display image and a display control unit that makes the display unit display the display image on the basis of the image display signal transmitted from the reader/writer,
wherein the display control unit is driven be being supplied with a direct current signal or an alternating current signal with a predetermined voltage, and
wherein the reader/writer includes a power supply unit that supplies the direct current signal or the alternating current signal with the predetermined voltage to the display control unit of the image-memory-type display medium.

* * * * *